(12) United States Patent
Bailis et al.

(10) Patent No.: US 6,593,771 B2
(45) Date of Patent: Jul. 15, 2003

(54) METHOD AND SYSTEM FOR USE OF A FIELD PROGRAMMABLE INTERCONNECT WITHIN AN ASIC FOR CONFIGURING THE ASIC

(75) Inventors: Robert Thomas Bailis, Cary, NC (US); Charles Edward Kuhlmann, Raleigh, NC (US); Charles Steven Lingafelt, Durham, NC (US); Ann Marie Rincon, Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/015,922

(22) Filed: Dec. 10, 2001

(65) Prior Publication Data

US 2003/0107398 A1 Jun. 12, 2003

(51) Int. Cl.[7] .................................................. G06F 7/38
(52) U.S. Cl. .............................. 326/38; 326/41; 326/47
(58) Field of Search ................................ 326/37–41, 47

(56) References Cited

U.S. PATENT DOCUMENTS 6,275,491 B1 * 8/2001 Prasad et al. ................ 370/389
6,326,806 B1 * 12/2001 Fallside et al. ............... 326/38

* cited by examiner

*Primary Examiner*—Michael Tokar
*Assistant Examiner*—Anh Q. Tran
(74) *Attorney, Agent, or Firm*—Joscelyn G. Cockburn; Sawyer Law Group

(57) ABSTRACT

An integrated circuit comprising a standard cell is disclosed. The standard cell includes a plurality of logic functions; at least a portion of the logic functions requiring initialization. The circuit includes a field programmable gate array (FPGA) cell coupled to the at least a portion of the plurality of logic functions. The at least a portion of the plurality of logic functions are initialized by the FPGA cell. In a method and system in accordance with the present invention, an on-chip Field Programmable Gate Array (FPGA) cell is configured to implement the required application-specific function initializations. The FPGA cell could be wired directly to each of the registers within the functional blocks requiring initialization. These registers would also be wired to the processor bus allowing software access for normal operation after initialization. Access to these registers can be controlled by a simple muxing structure that allows the FPGA to have direct access to the registers when the chip initialization sequence takes place (Chip_Init signal is asserted) and allows the processor bus to have access after initialization is complete (Chip_Init signal is de-asserted).

7 Claims, 2 Drawing Sheets

METHOD AND SYSTEM FOR USE OF A FIELD PROGRAMMABLE INTERCONNECT WITHIN AN ASIC FOR CONFIGURING THE ASIC

CROSS-RELATED APPLICATIONS

The present application is related to the following listed seven applications: Ser. No. 10/016346, filed Dec. 10, 2001, entitled "Field Programmable Network Processor and Method for Customizing a Network Processor;" Ser. No. 10/016772, filed Dec. 10, 2001, entitled "Method and System for Use of an Embedded Field Programmable Gate Array Interconnect for Flexible I/O Connectivity;" Ser. No. 10/016449, filed Dec. 10, 2001, entitled "Method and System for Use of a Field Programmable Gate Array (FPGA) Function Within an Application Specific Integrated Circuit (ASIC) to Enable Creation of a Debugger Client Within the ASIC;" Ser. No. 10/016448, filed Dec. 10, 2001, entitled "Method and System for Use of a Field Programmable Function Within an Application Specific Integrated Circuit (ASIC) To Access Internal Signals for External Observation and Control;" Ser. No. 10/015920, filed Dec. 10, 2001, entitled "Method and System for Use of a Field Programmable Function Within a Chip to Enable Configurable I/O Signal Timing Characteristics;" Ser. No. 10/015923, filed Dec. 10, 2001, entitled "Method and System for Use of a Field Programmable Function Within a Standard Cell Chip for Repair of Logic Circuits;" and Ser. No. 10/015921, filed Dec. 10, 2001, entitled "Method and System for Use of a Field Programmable Gate Array 9FPGA) Cell for Controlling Access to On-Chip Functions of a System on a Chip (S)C) Integrated Circuit;" assigned to the assignee of the present application, and filed on the same date.

FIELD OF THE INVENTION

The present invention relates generally to application specific integrated circuits (ASICs) and specifically to providing a Field Programmable Gate. Array (FPGA) cell within an ASIC for configuring the ASIC.

BACKGROUND OF THE INVENTION

Many integrated circuits, particularly software programmable processor chips, require initialization procedures in order to configure the chip to perform specific functions correctly. For example, both the on-chip memory (OCM) controller function and the universal interrupt controller (UIC) on a PowerPC processor, part number PPC405GP, manufactured by IBM Corporation, require initialization after processor reset, for best performance in the case of the OCM and for proper operation in case of the UIC. Other PowerPC processor on-chip functions, such as the UART controller, may require initialization depending upon the application. Currently each user of the PowerPC processor must code these required initialization routines in software which can be time consuming and difficult to debug. Initializing the OCM for both Instruction-side and Data-side operations is a 12-step process. Initializing the UIC is more complex and varies depending on the application. Initialization of external system components or system-specific chip facilities must also be performed in addition to the basic initialization required for the processor.

Accordingly, what is needed is a system and method for initializing the chip to allow for proper configuration within the complexity of existing conventional initialization procedures. The system should be cost effective and easily implemented in existing circuits. The present invention addresses such a need.

SUMMARY OF THE INVENTION

An integrated circuit comprising a standard cell is disclosed. The standard cell includes a plurality of logic functions; at least a portion of the logic functions requiring initialization. The circuit includes a field programmable gate array (FPGA) cell coupled to the at least a portion of the plurality of logic functions. The at least a portion of the plurality of logic functions are initialized by the FPGA cell.

In a method and system in accordance with the present invention, an on-chip Field Programmable Gate Array (FPGA) cell is configured to implement the required application-specific function initializations. The FPGA cell could be wired directly to each of the registers within the functional blocks requiring initialization. These registers would also be wired to the processor bus allowing software access for normal operation after initialization. Access to these registers can be controlled by a simple muxing structure that allows the FPGA to have direct access to the registers when the chip initialization sequence takes place (Chip_Init signal is asserted) and allows the processor bus to have access after initialization is complete (Chip_Init signal is de-asserted)

DETAILED DESCRIPTION

The present invention relates generally to ASICs and specifically to providing a FPGA cell within the ASIC for configuring the ASIC. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Initialization sequences performed after processor reset are currently implemented using a series of software commands executed by the central processing unit (CPU). Examples of tasks performed by initialization software include writing the addresses of memory locations associated with a particular function into a series of on-chip registers, and/or writing and monitoring a series of control bits in a designated control register(s). In a method and system in accordance with the present invention, these functions could be performed by an on-chip Field Programmable Gate Array (FPGA) cell configured to implement the application-specific function initializations required.

The FPGA cell could be wired directly to each of the registers within the functional blocks requiring initialization. These registers would also be wired to the processor bus allowing software access for normal operation after initialization.

Access to these registers can be controlled by a simple muxing structure that allows the FPGA to have direct access to the registers when the chip initialization sequence takes place (Chip_Init signal is asserted) and allows the processor bus to have access after initialization is complete (Chip_Init signal is de-asserted).

To describe the present invention in more detail, refer now to the following discussion in conjunction with the accompanying figures.

Figure 1:
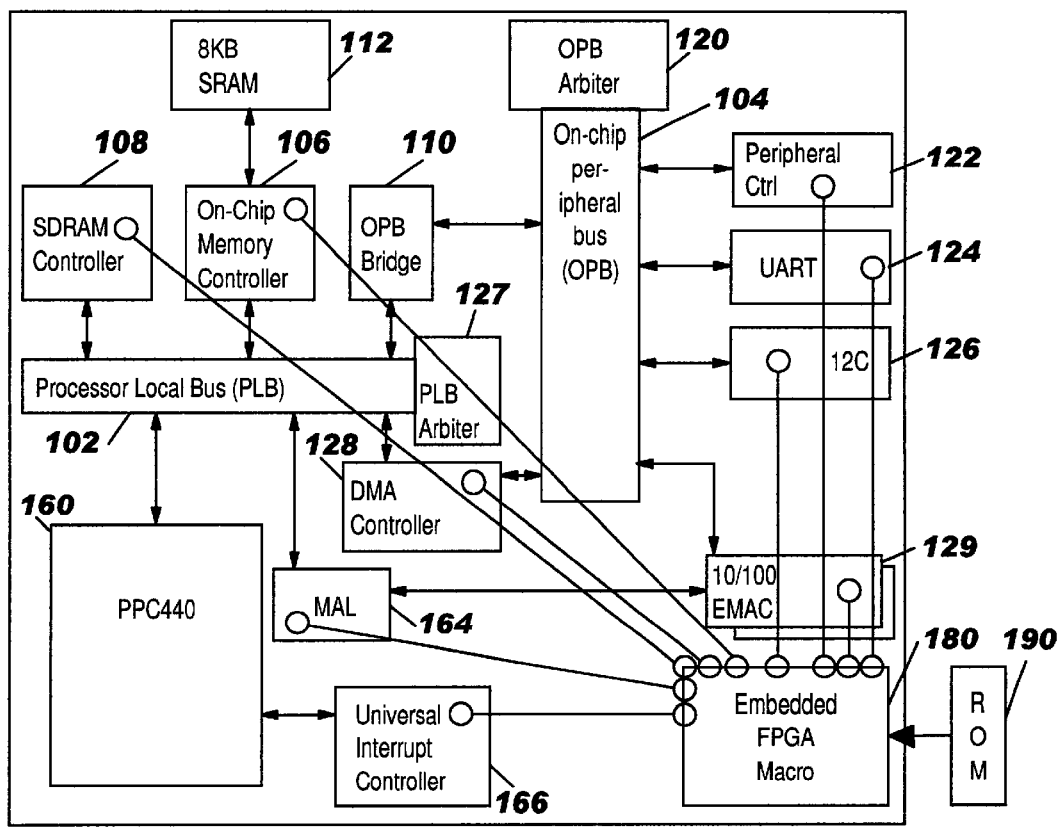
FIG. 1 illustrates a processor chip, which utilizes a field programmable gate array (FPGA) in accordance with the present invention.

FIG. 1 illustrates a processor chip, which utilizes a field programmable gate array (FPGA) in accordance with the present invention. Although the present invention will be discussed in the context of utilizing an embedded FPGA cell in conjunction with a processor, one of ordinary skill in the art readily recognizes that the system and method in accordance with the present invention could be utilized in a variety of devices. The key element for the devices is that portions of the device must be initialized to configure the device.

As is seen, the processor chip 100 includes a processor local bus (PLB) 102, and an on chip peripheral bus (OPB) 104. As is also seen, there are a plurality of functional blocks coupled to these busses 102 and 104. As is seen, an on-chip memory controller (OCM) 106, an SDRAM controller 108 and OPB bridge 110 are all in communication with the PLB 102. An SRAM 112 is coupled to the OCM 106. The PLB 102 also includes a PLB arbitration unit 127.

The OPB bridge 110 is also in communication with an on-chip peripheral bus 104, which also includes an arbitration unit 120. There are a plurality of devices that interact with the on-chip peripheral bus 104. As is seen, they include a peripheral controller 122, a UART 124, an I²C device 126 and media access controller (MAC) 129. A DMA controller 128 is also coupled between the PLB 102 and OPB 104.

The PLB 102 also communicates with a microprocessor 160, a media access layer (MAL) function 164 which is in communication with the media access controller 129. An interrupt controller 166 receives signals from an FPGA cell 180, which are provided, to the microprocessor 160.

In this embodiment an FPGA cell 180 is wired directly (designated by the circle) to each functional block that requires initialization. In this embodiment, the SRAM controller 108, the OCM 106, the DMA controller 128, the interrupt controller 166, the MAL 164, the peripheral controller 122, the UART 124, I²C device 126 and the MAC 129 all require initialization. The FPGA cell 180 is loaded with the appropriate initialization procedures for configuring the functional blocks of the processor 160, preferably by a read-only memory ROM 190.

It should be readily understood that functions within a device which require initialization are likely to be different depending upon the type of device and its function. Therefore, one of ordinary skill in the art readily recognizes that other functions to bed initialized could be within the device and the functions of the FPGA cell to initialize those functions would be within the spirit and scope of the present invention. Accordingly, there could be, for example, a PLB master/slave function, an accelerator function, rapid I/O function, an OPB master/slave function, a GPIO preprocessor function and a variety of other functions and their configuration utilizing the FPGA cell would be within the spirit and scope of the present invention.

Figure 2:
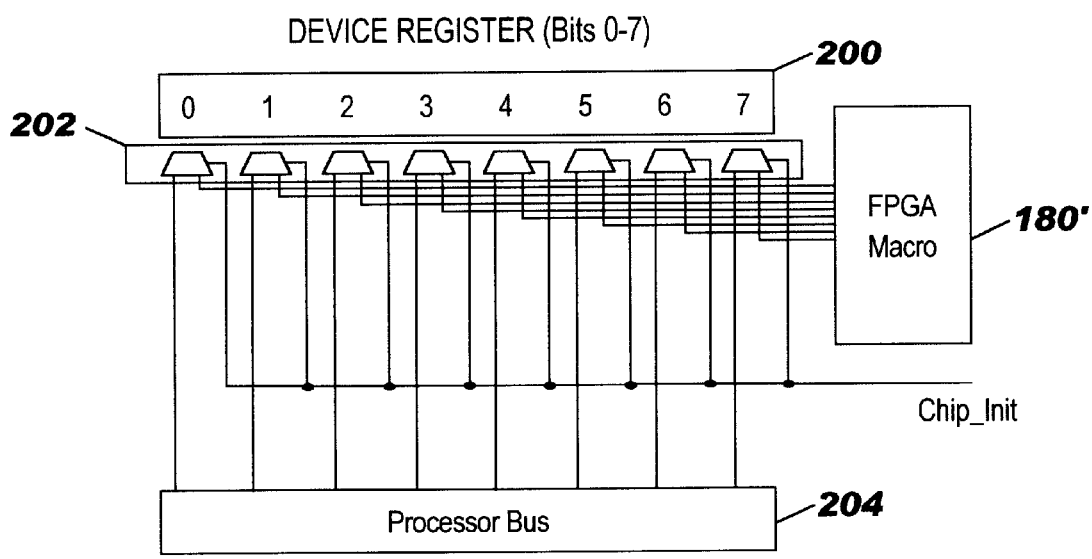
FIG. 2 illustrates a system for allowing the registers within the functions to be controlled by the FPGA cell or the processor.

To allow for initialization of the functions as well as normal operation, a muxing structure is provided. To describe this feature refer now to the following. FIG. 2 illustrates a system for allowing the registers within the functions to be controlled by the FPGA cell or the processor.

In this system, a device register 200 holds the bits that relate to initialization. A muxing structure 202 comprising a plurality of multiplexers is coupled to the FPGA cell 180 and the processor bus 204. Access to the device register 200 is controlled by a simple muxing structure that allows the FPGA to have direct access to the registers when the chip initialization sequence takes place (Chip_Init signal is asserted) and allows the processor bus to have access after initialization is complete (Chip_Init signal is deasserted).

Advantages

1. Performance—Initialization performed by the FPGA will operate at hardware speeds greater than 100 MHz, orders of magnitude more quickly than a similar implementation in software.

2. Debug Assist—Errors in processor hardware may make correct execution of software initialization routines impossible. This is most likely to occur in the bring-up and debug phase of early processor hardware. Performing initialization using logic in on-chip FPGA would allow chip designers to continue testing chip functions that require initialization to be complete.

3. Reduce programming complexity. Chips requiring software initialization are often delivered without any pre-written initialization code. As a result each new user of the chip must re-create and test the required initialization code for the chip. Information on how to correctly initialize on-chip functions is often absent from the documentation accompanying the chip or is out of date.

4. Application-specific flexibility. Initialization needs may vary from one application or customer to another. Not all customers use all functions available on a standard product and only need to initialize a subset of functions. Items such as memory maps (assigning memory address space to individual functions) can vary by customers or application. FPGA cells can be configured to meet the initialization needs of individual customer or application. The appropriate customization file for the application can be delivered with the chip as a service from the chip provider and later altered, if needed, by the customer. The customer could also create their FPGA configuration file if one was not provided to improve initialization performance (1) or assist in debug (2).

5. Enables a chip manufacturer to ship a more complete solution by providing a debugged, working default chip configuration that can be loaded in the FPGA. This can improve time to market for customers using the chip and who want to speed bring-up/debug of systems by starting with a known working chip configuration. Because, in this case, the loadable FPGA code can be supplied as an "object" file with checksum to ensure that it is not corrupt, the opportunity to misconfigure the chip (into the default state) is decreased. This is especially true when initializing communications links like UARTS whose function must be correctly configured before the chip can be used operationally.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An integrated circuit comprising:
   a standard cell, the standard cell including a plurality of logic functions;
   a field programmable gate array (FPGA) cell coupled to the at least a portion of the plurality of logic functions, wherein the at least a portion of the plurality of logic functions are initialized based upon a sequence of hardware operations loaded by the FPGA cell which receives the hardware operations from a read only memory (ROM); and a muxing structure coupled to the standard cell and the FPGA cell that allows the FPGA cell to have direct access to at least a portion of the plurality of logic functions when initialization takes place and allows a bus within the standard cell to have direct access after initialization is complete.

2. A processor chip comprising:

a standard cell, the standard cell including a plurality of logic functions initialized based upon a sequence of hardware operations;

at least one bus coupled to the plurality of logic functions;

a field programmable gate array (FPGA) cell coupled to the at least a portion of the plurality of logic functions; wherein the at least a portion of the plurality of logic functions are initialized utilizing the FPGA cell;

a read only memory (ROM) for providing the hardware operations to the FPGA; and a muxing structure coupled to the standard cell and the FPGA cell that allows the FPGA cell to have direct access to at least a portion of the plurality of logic functions when initialization takes place and allows a bus within the standard cell to have direct access after initialization is complete.

3. A processor chip comprising:

a standard cell, the standard cell including a plurality of logic functions, at least one bus coupled to the plurality of logic functions;

a field programmable gate array (FPGA) cell coupled to the plurality of logic functions; wherein the at least a portion of the plurality of logic functions are initialized utilizing the FPGA cell; and a muxing structure coupled to the standard cell and the FPGA cell that allows the FPGA cell to have direct access to at least a portion of the plurality of logic functions when initialization takes place and allows a bus within the standard cell to have direct access after initialization is complete.

4. The processor chip of claim 3 wherein the at least a portion of the plurality of logic functions are initialized based upon a sequence of hardware operations loaded by the FPGA cell.

5. The processor chip of claim 4 wherein the FPGA cell receives the hardware operations from a read only memory (ROM).

6. A processor chip comprising:

a standard cell, the standard cell including a plurality of logic functions;

at least one bus operatively positioned within the standard cell;

a field programmable gate array (FPGA) cell coupled to the plurality of logic functions; wherein the at least a portion of the plurality of logic functions are initialized utilizing the FPGA cell; and a muxing structure operatively coupled to the standard cell and the FPGA cell that allows the FPGA cell and the bus within the standard cell to have direct access to at least a portion of the plurality of logic functions.

7. The chip of claim 6 further including a microprocessor operatively coupled to the bus.

* * * * *